May 20, 1952 B. CAPLAN Re. 23,491

EXTENSIBLE HEM GARMENT CONSTRUCTION

Original Filed Nov. 23, 1948 3 Sheets-Sheet 1

INVENTOR.
Barney Caplan
BY
Leonard L. Kalish
Attorney

EXTENSIBLE HEM GARMENT CONSTRUCTION

Original Filed Nov. 23, 1948 3 Sheets-Sheet 2

INVENTOR.
Barney Caplan
BY
Leonard I. Kalish
Attorney

EXTENSIBLE HEM GARMENT CONSTRUCTION

Original Filed Nov. 23, 1948 3 Sheets-Sheet 3

INVENTOR.
Barney Caplan
BY
Leonard I. Kalish
Attorney

Reissued May 20, 1952 Re. 23,491

UNITED STATES PATENT OFFICE 23,491

EXTENSIBLE HEM GARMENT CONSTRUCTION

Barney Caplan, Camden, N. J.

Original No. 2,508,223, dated May 16, 1950, Serial No. 61,640, November 23, 1948. Application for reissue May 7, 1951, Serial No. 224,854

10 Claims. (Cl. 2—97)

Matter enclosed in heavy brackets [ ] appears in the original patent but forms no part of this reissue specification; matter printed in italics indicates the additions made by reissue.

The present invention relates generally to overcoats, jackets or the like and it relates more particularly to coats for growing children which can be quickly and easily lengthened from year to year.

An object of the present invention is to provide a new and improved construction for an overcoat or topcoat or jacket or the like. Another object of the present invention is to provide an overcoat or similar garment for growing children having a new and improved bottom hem construction permitting the coat to be lengthened quickly and easily, when required, without the need for restitching.

Other objects and advantages of the present invention are apparent in the following detailed description, appended claims and accompanying drawings.

It has been suggested in the past to provide overcoats or the like for growing children wherein the bottom hem is so constructed that the coat can be lengthened to permit it to be worn for two or more seasons.

These conventional constructions have not, however, proven entirely satisfactory since, in some cases, they have required a stitching operation on the lengthened garment and, in other cases, have involved relatively difficult and time-consuming stitch-removing operations or relatively complicated and expensive structural features.

[According to] *By* the present invention, I have [now] developed a new and improved extensible hem construction for coats or the like whereby both the coat and its lining can be lengthened quickly and easily, and without the need for restitching, by pulling loose a [single continuous] line of removable stitching or tacking which is ordinarily concealed from view and protected against accidental breaking and unraveling.

Generally speaking, the present invention contemplates an extensible hem construction for an overcoat or the like having a lining (and, optionally, also an inter-lining) wherein both the coat and the lining are turned upward and inward (i. e., toward each other) to provide hems, and a continuous annular line of removable stitching or tacking is then applied so as to fasten the upper edge of the upturned hem of the coat to the outer ply of the coat material (by "blind" or invisible stitches) and to fasten the upper edge of the upturned hem of the lining to the outer ply of the lining material (or, to the inner-lining where one is present).

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figures 1, 2, 3:
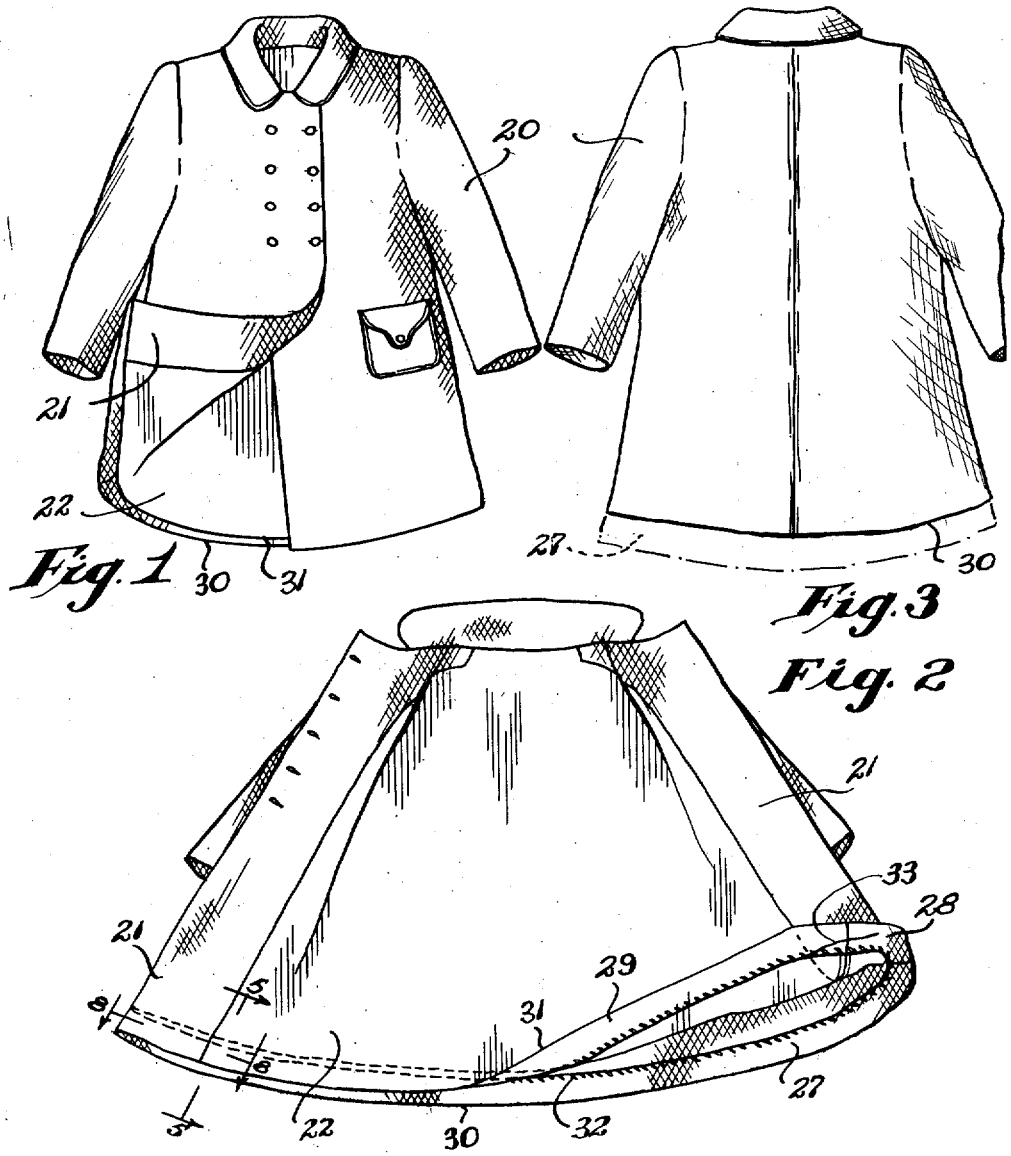
Figure 1 represents a front elevational view *of* [as] one embodiment of the present invention as it appears before lengthening.
Figure 2 represents an elevational view of the embodiment of Figure 1 shown in unbuttoned position and with the lower edge turned up at one side so as better to reveal the construction of the bottom hem.
Figure 3 represents an elevational view showing the rear of the embodiment of Figure 1; the lengthened position of the bottom hem being shown in dash-dot lines.

In Figures 1–8, I have shown an overcoat intended for a growing girl which embodies the present invention and which includes an outer ply 20 of relatively heavy-weight fabric (which is referred to hereinafter as the coat-ply), having left and right facings 21, between the inner free edges of which extends a lining 22 of light-weight fabric such as silk or rayon or nylon, as indicated particularly in Figure 2.

Figure 4:
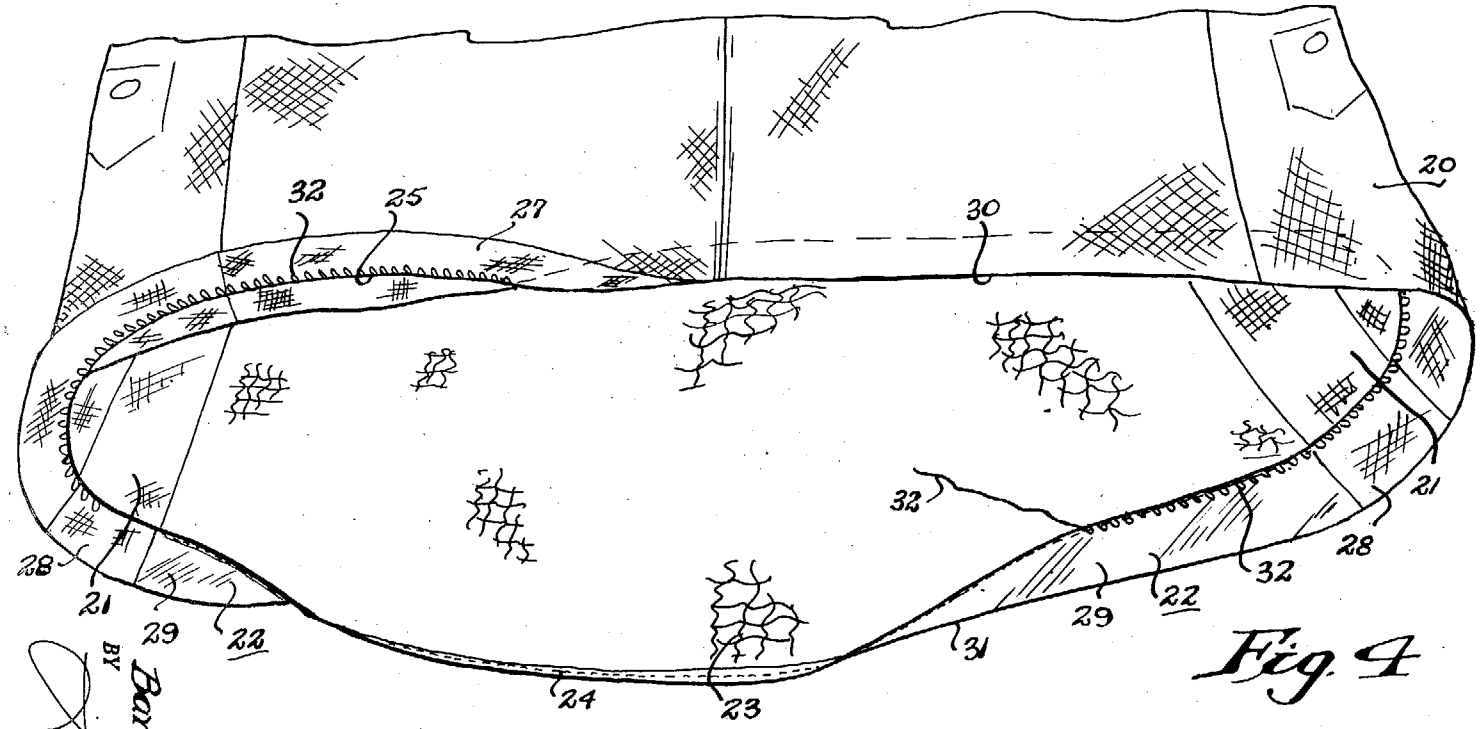
Figure 4 represents a fragmentary perspective view, on an enlarged scale, showing the rear of the coat as it appears when the coat ply is turned up and with the removable stitching partly pulled loose, freeing a portion of the lining hem.
Figure 5:
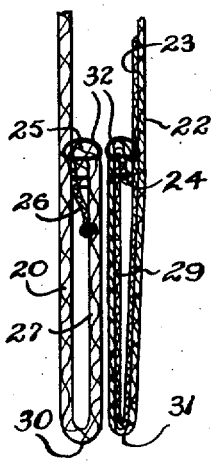
Figure 5 represents a cross-sectional view generally along the line 5—5 of Figure 2.

An inter-lining 23 (which is of relatively coarse mesh material providing additional warmth) may be provided on the inner side of the lining 22 (so that it is intermediate the lining and the coat-ply, as indicated particularly in Figure 5). The lower edge of the inter-lining 23 is fastened to the lowermost free edge of the lining 22 by the bottom stitching 24, as indicated particularly in Figure 4.

In forming the novel extensible hem construction of the present invention, I turn up the lowermost edge 25 of the coat-ply 20 (which is hemmed and finished off with a tape 26 in generally conventional manner) so as to provide a relatively large hem 27 which may be of the order of 2–2½ inch width or transverse dimension.

The facings 21 are similarly turned up at their bottom edges as at 28 and the lining 22 (with its associated inter-lining 23) is also turned up to provide a hem 29 of approximately the same transverse dimension. However, the fold-line 30 forming the hem 27 is somewhat lower than fold-line 31 forming the hem 29 so that, as indicated particularly in Figures 1 and 5, the coat-ply will extend downward somewhat beyond the lining so as to conceal it from view.

A single continuous line of readily removable stitching or tacking 32 is then applied so as to fasten the up-turned free edges of the hems 27 and 28 to the juxtaposed fabric plies. That is, the stitching which may begin adjacent one edge of the coat-ply 20 (see for example the right-hand edge in Figure 2) is first run along the free edge 25 of the hem 27 until it reaches the other edge of the coat-ply 20 and is then continued along the hem 28 of the facing 21 and along the upper edge of the hem 29 of the lining 22 and finally along the upper edge of the other facing hem 28 back to its starting point. The stitching is then contained diagonally along the hem 27 a short distance as at 33.

The stitching 32 is of a type well known in the art and is made up of a succession of loops which come apart when one end of the thread is broken and pulled so that the entire line of stitching can be unraveled or ripped out in a single more or less continuous operation.

Where the stitching 32 is affixed to the coat-ply 20 it is of a "blind" or invisible stitch type wherein the thread enters the inner side of the fabric but is not visible on the outer side.

That portion of the stitching 32 which holds the hem 29 is also "blind" or invisible when the coat is opened as in Figure 2; the stitches passing through the hem 29 and both plies of the inter-lining 23 but not passing through the body of the lining 22, as indicated particularly in Figure 5.

It is apparent that the stitching 32 is thus fully concealed from view when the coat is worn, prior to lengthening, and is protected against accidental catching and breaking of the threads such as would otherwise inadvertently result in unraveling of the stitching.

As is customary in coats of this general type, particularly girls' coats, the lower edge of the lining is thus left free and is not stitched to the coat-ply.

When it is desired to lengthen the coat, the coat-ply and the lining are spread apart or opened in the manner indicated in Figure 2 to expose the end-stitching 33. This stitching is then broken and the free end of the thread is pulled so as progressively to unravel said stitching.

Figure 6:
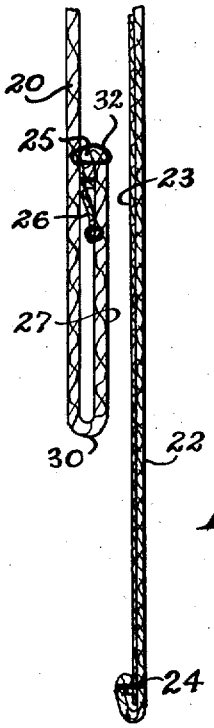
Figure 6 represents a cross-sectional view generally like that of Figure 5 but showing the coat as it would appear during an intermediate stage in the lengthening operation; that is, with the removable stitching pulled out sufficiently to free the lining hem but not yet to free the coat hem.

Thus, as indicated particularly in Figure 4, the unraveling of the stitching proceeds first along the hem 28 of the facing 21 and then along the hem 29 of the lining 22 thereby permitting the hems to drop down to the lengthened position. Figure 6 is a more or less schematic representation of this intermediate condition wherein the lining hem 29 has been opened while the coat-ply hem 27 is still secured.

Figure 7:
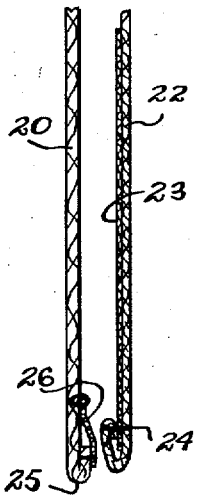
Figure 7 represents a cross-sectional view generally like those of Figures 5 and 6 but showing the appearance of the coat after the removable stitching has been completely pulled out so as to free both the lining hem and the coat hem.
Figure 8:
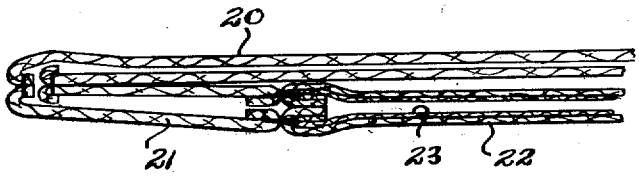
Figure 8 represents a cross-sectional view generally along the line 8—8 of Figure 2.

Further unraveling of the stitching would progressively open the hem 28 of the other facing 21 and the hem 27 of the coat-ply 20 and, ultimately, the entire stitching is pulled out whereupon the hems are completely held down in the manner indicated in Figure 7 and also indicated in dash-dot lines in Figure 3.

Thereafter, it is necessary merely to press the lower edge of the garment to remove the impressions of the fold-lines 30 and 31 whereupon the garment is ready for use in lengthened condition.

It is possible to provide identical extensible hem constructions (not shown) at the free edges of the sleeves so that they, too, can be lengthened. However, where such extensible hem constructions are provided for the sleeves, it may be desirable to stitch the free edge of the outer ply (corresponding to the edge 25) to the adjoining free edge of the lining to prevent the lining from being pulled up into the sleeve when the coat is removed.

While the novel coat construction of the present invention has been shown in the drawings as including an inter-lining 23, this inter-lining is not essential and can be omitted if desired. In such case, the stitching 32 will fasten the uppermost free edge of the upturned hem 29 directly to the lining 22 (instead of to the intervening inter-lining 23) and, in all other respects, the structure will be identical.

While particularly well adapted for use in overcoats for growing children, the present invention is not limited to this particular type of garment and, in addition, can be used in jackets, top-coats and other types of similar, lined garments.

Similarly, while particularly well adapted for lengthening the lowermost free edges of coats or the like, the novel extensible hem construction of the present invention can also be used in coat sleeves and the like.

From the foregoing description, it is obvious that the novel extensible hem construction of the present invention permits the lengthening of hems and the like with a minimum of time and effort required. Indeed, the stitching 32 can be broken and completely removed in a matter of a few seconds and the lengthened garment is then ready for use in the few minutes required to press out the fold-lines 30 and 31.

No stitching or other expert operations such as would require the services of a tailor are necessary.

The novel extensible hem construction of the present invention in no way impairs the appearance of the garment either before or after lengthening. Thus, the seam 32 is fully concealed from view prior to lengthening so that the garment presents the appearance of an ordinary garment having a standard hem-line.

After lengthening, the appearance of the garment is also no different from what would ordinarily be the case since the thread-holes are not visible at the extended portion of the coat-ply which is of relatively coarse-textured heavy fabric.

Since the stitching 32 is fully enclosed intermediate the upturned hems, it is protected against inadvertent breaking and unraveling such as might very well result if it were visible and exposed on the inside of the lining (as is the case with certain prior-art structures). Thus, if the removable stitching were visible and exposed on the inside of the lining (as, for example, if viewed as in Figure 2) it could readily be torn when being put on or taken off by the wearer.

In the present construction, on the other hand, it is virtually impossible for the stitching 32 to be accidentally broken since it is well concealed and protected and, at the same time, it is readily accessible when it is desired to lengthen the hem.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, I claim as new and desire to protect by Letters Patent:

1. A garment construction comprising an outer-ply having a relatively wide bottom hem turned inwardly so that it is not visible from the outside of the garment, a lining having a bottom hem of generally the same width as the first-mentioned hem, said lining hem also being turned inwardly so that it is not visible from the inside of the garment, and a single continuous generally annular line of readily removable stitching extending around the inturned hem-lines, said stitching fastening the upturned edge of the first-mentioned hem to the outer-ply and fastening the upturned edge of the second-mentioned hem to the lining while leaving the remainder of said hems unfastened whereby said hems are retained in upwardly-directed position but are free to unfold and fall when the stitching is removed in a single operation, thereby to lengthen both the outer-ply and the lining.

2. A garment construction comprising an outer-ply having a relatively wide bottom hem turned inwardly so that it is not visible from the outside of the garment, a lining having a bottom hem of generally the same width as the first-mentioned hem, said lining hem also being turned inwardly so that it is not visible from the inside of the garment, and a single continuous generally annular line of readily removable stitching fastening the uppermost edges of said hems to the underlying material while leaving the bottoms of said outer-ply and said lining unconnected, said stitching being removable in a single operation thereby to free said hem edges and to lengthen both the outer-ply and the lining.

3. A garment construction comprising an outer-ply having a relatively wide bottom hem turned inwardly so that it is not visible from the outside of the garment, a lining, an inter-lining disposed underneath said lining and fastened thereto at the lower edge thereof, said lining and inter-lining being turned inwardly to provide a bottom hem of generally the same width as the first-mentioned hem, said second-mentioned hem not being visible from the inside of the garment, and a single continuous generally annular line of readily removable stitching extending around the inturned hem-lines, said stitching fastening the upturned edge of the first-mentioned hem to the outer-ply and fastening the upturned edge of the second-mentioned hem to the inter-lining while leaving the remainder of said hems unfastened whereby said hems are retained in upwardly-directed position but are free to unfold and fall when the stitching is removed in a single operation, thereby to lengthen both the outer-ply and the lining.

4. A garment construction comprising an outer-ply having a relatively wide bottom hem turned inwardly so that it is not visible from the outside of the garment, a lining, an inter-lining disposed underneath said lining and fastened thereto at the lower edge thereof, said lining and inter-lining being turned inwardly to provide a bottom hem of generally the same width as the first-mentioned hem, said second-mentioned hem not being visible from the inside of the garment, and a single continuous generally annular line of readily removable stitching fastening the uppermost edges of said hems to the underlying material while leaving the bottoms of said outer-ply and said lining unconnected, said stitching being removable in a single operation thereby to free said hem edges and to lengthen both the outer-ply and the lining.

5. An extensible coat for a growing child comprising an outer coat-ply of relatively heavy fabric or the like having a relatively wide bottom hem turned inwardly so that it is not visible from the outside of the coat, a lining of relatively thin fabric having a bottom hem of generally the same width as the first-mentioned hem, said lining hem also being turned inwardly so that it is not visible from the inside of the garment, and a single continuous generally annular line of readily removable stitching extending around the inturned hems and fastening the uppermost edges of said hems, said stitching fastening the upper edge of the first-mentioned hem to the fabric of the coat-ply with blind stitches invisible from the outside of the coat, said stitching fastening the upper edge of the second-mentioned hem to the lining whereby said hems are retained in upwardly-directed position but with no connection between the bottoms of the coat-ply and the lining, said hems being free to unfold and fall when the stitching is removed in a single operation, thereby to lengthen both the coat-ply and the lining.

6. An extensible coat for a growing child comprising an outer coat-ply of relatively heavy fabric or the like having a relatively wide bottom hem turned inwardly so that it is not visible from the outside of the coat, a lining of relatively thin fabric or the like having an inter-lining disposed on the inner side thereof and fastened thereto at its bottom, said lining and inter-lining being turned inwardly to provide a bottom hem of generally the same width as the first-mentioned hem, and a single continuous generally annular line of readily removable stitching extending around the inturned hems, said stitching fastening the upper edge of the second-mentioned hem to the inter-lining with stitches which are invisible from the inside of the coat while leaving the remainder of said second-mentioned hem unconnected, said hem being retained in upwardly-directed position by said stitching but being free to unfold and fall when the stitching is removed in a single operation, thereby to lengthen both the outer-ply and the lining and its associated inter-lining.

*7. A garment construction comprising an outer-ply having a relatively wide bottom extensible hem turned inwardly so that it is not visible from the outside of the garment, a lining having a bottom extensible hem of generally the same width as the first-mentioned hem, said*

*lining hem also being turned inwardly so that it is not visible from the inside of the garment, and a generally annular line of readily removable stitching extending around the inturned hem-lines, said stitching fastening the upturned edge of the first-mentioned hem to the outer-ply independently of the lining and fastening the upturned edge of the second-mentioned hem to the lining independently of the outer ply while leaving the remainder of said hems unfastened with said first-mentioned hem and said second-mentioned hem being disconnected whereby said hems are retained in upwardly-directed position but are free to unfold and fall when the stitching is removed thereby to lengthen both the outer-ply and the lining; the outer fabric having a finished permanent bottom hem independent of the lining.*

*8. A garment construction comprising an outer-ply having a relatively wide bottom extensible hem turned inwardly so that it is not visible from the outside of the garment, a lining having a bottom extensible hem of generally the same width as the first-mentioned hem, said lining hem also being turned inwardly so that it is not visible from the inside of the garment, and a generally annular line of readily removable stitching fastening the uppermost edges of said hems to the corresponding underlying material while leaving the uppermost edges of said hems disconnected from each other and leaving the bottoms of said outer-ply and said lining unconnected, said stitching being removable thereby to free said hem edges and to lengthen both the outer-ply and the lining; the outer fabric having a finished permanent bottom hem independent of the lining.*

*9. A garment construction comprising an outer-ply having a finished permanent bottom hem and a relatively wide bottom extensible hem turned inwardly so that it is not visible from the outside of the garment, a lining having a bottom extensible hem of generally the same width as the first-mentioned hem, said lining hem also being turned inwardly so that it is not visible from the inside of the garment, and a generally annular line of readily removable stitching extending along the inturned hem-lines, said stitching fastening the upturned edge of the first-mentioned hem to the outer-ply and fastening the upturned edge of the second-mentioned hem to the lining, the up-turned edge of the first-mentioned hem and the up-turned edge of the second-mentioned hem being disconnected.*

*10. A garment construction comprising an outer-ply formed of body-cloth having a narrow*

*portion of its lowermost margin turned inwardly, a tape having one edge thereof sewn to the exposed face of said narrow inturned marginal portion and having the other edge thereof stitched to the body of the cloth adjacent the edge of the narrow inturned marginal portion, said tape being wholly invisible from the other side of said outer-ply, said narrow inturned marginal portion and said tape forming a more or less permanent hem which becomes the bottom of the garment when the outer-ply is in its extended or lengthened condition, a relatively wide marginal portion of said outer-ply along the bottom of the garment, including the aforesaid inturned and taped marginal portion, being turned inwardly to form a relatively wide extensible bottom hem invisible from the outside of the garment when in its upturned or un-extended condition, a lining having a relatively wide bottom marginal portion thereof, of approximately the same width as the inturned extensible hem of the outer-ply, also turned inwardly to form an upturned extensible hem facing the upturned extensible hem of the outer-ply, said extensible lining-hem being invisible from the inside of the garment when in its upturned condition, and readily removable stitching extending along the upper edges of the inturned extensible hem portions of outer-ply and lining, said readily removable stitching fastening the upper edge of the inturned extensible hem of the outer-ply to the outer-ply independently of the lining and fastening the upper edge of the inturned extensible hem of the lining to the lining independently of the outer-ply, the upper edge of the up-turned extensible hem of the outer-ply and the upper edge of the upturned extensible hem of the lining being disconnected.*

BARNEY CAPLAN.

REFERENCES CITED

The following references are of record in the file of this patent or the original patent:

UNITED STATES PATENTS

| Number | Name | Date |
|---|---|---|
| 2,426,500 | Goldstein | Aug. 26, 1947 |

FOREIGN PATENTS

| Number | Country | Date |
|---|---|---|
| 13,572 | Australia | Oct. 23, 1928 |
| 488,381 | Great Britain | July 15, 1938 |
| 557,408 | Great Britain | Nov. 18, 1943 |
| 589,459 | Great Britain | June 20, 1947 |
| 607,759 | Great Britain | Sept. 3, 1948 |